March 27, 1962

H. K. FARR 3,027,511

VECTOR BRIDGE

Filed Oct. 10, 1958

INVENTOR
HAROLD K. FARR
BY *Mitchell & Bechert*
ATTORNEYS

March 27, 1962  H. K. FARR  3,027,511
VECTOR BRIDGE
Filed Oct. 10, 1958  4 Sheets-Sheet 2

INVENTOR
HAROLD K. FARR
BY Mitchell & Bechert
ATTORNEYS

Fig. 10.

United States Patent Office 3,027,511
Patented Mar. 27, 1962

3,027,511
VECTOR BRIDGE
Harold K. Farr, Roxbury, Conn., assignor to The Harris Transducer Corporation, Woodbury, Conn., a corporation of Connecticut
Filed Oct. 10, 1958, Ser. No. 766,483
21 Claims. (Cl. 324—57)

This invention relates to a device for measuring phase angle and magnitude of an impedance at frequencies in the audio and radio-frequency range, and more particularly to a bridge circuit capable of measuring such characteristics of an unknown impedance.

Bridge circuits are known which can be used in the determination of such quantities. These bridge circuits at best are direct-reading in phase angle at only one or a few discrete frequencies. Corrections must be applied to the phase angle indications when measurements are made at other frequencies. Such bridges are not direct-reading in impedance magnitude but produce indications which may be converted by suitable calculations to impedance measurements. Direct-reading phase "meters" with wide frequency response have become known in recent years, but these depend for their operation on the manipulation of wave-forms by electronic devices and do not have the stability and accuracy of a true bridge circuit.

Accordingly, it is an object of this invention to provide a bridge circuit which provides a reading of the unknown phase angle directly on substantially linear dials with high precision over a wide range of frequencies, phase angle and impedance magnitude.

It is a further object of the invention to provide a bridge circuit which provides a direct measurement of the magnitude of an unknown impedance or of an unknown admittance.

It is still a further object of this invention to provide a vector bridge which gives a direct measurement of both polar coordinates, phase angle and impedance magnitude, of an unknown impedance, or corresponding quantities for an unknown admittance.

In accordance with an aspect of this invention, there is provided a bridge circuit for measuring the phase angle of an unknown impedance (or admittance). In its simplest form, the bridge circuit is characterized by one fixed and one variable resistor in two respective arms connected to one diagonal point of the bridge, a capacitor having a predetermined reactance at a given frequency and a variable resistor in a third arm of the bridge, and the unknown impedance in the fourth arm of the bridge; the third and fourth arms being connected to the opposite diagonal point of the bridge. An alternating current of the given frequency is applied to said opposite diagonal points and the phase angle of the unknown impedance is determined by simply varying the variable resistors until the bridge is balanced. A dial coupled to the variable resistor which is in series with the capacitor may be graduated to give a direct-reading of the phase angle.

In accordance with another aspect of the invention, there is provided a second bridge circuit for setting the capacitor at the predetermined reactance. Switching means are provided for selectively switching the capacitor from the second bridge, where its reactance is set, to the first bridge, where only the variable resistors may be adjusted for determining the phase angle of the unknown impedance.

In accordance with still another aspect of the invention, there is provided a device for measuring the polar coordinates of a complex impedance, comprising the bridge circuits mentioned above and in addition a third bridge circuit for measuring the magnitude of the unknown impedance. The impedance magnitude of the measuring bridge is characterized by utilizing at least one of the components in the phase angle measuring bridge and by coupling the resistive components in two respective arms of the impedance bridge to resistive components in corresponding arms of the phase angle measuring bridge. The component values are selected so that adjustment of the phase angle measuring bridge automatically adjusts the associated component in the impedance measuring bridge. By this unique arrangement, the impedance magnitude may be determined simply by varying only one resistive component in one of the arms of the bridge.

The above-mentioned and other features and objects of this invention and the manner of attaining them will become more apparent and the invention itself will be best understood by reference to the following description of embodiments of the invention taken in conjunction with the accompanying drawings, wherein:

Since the vector bridge measures two parameters of an unknown impedance, phase angle and impedance magnitude, the circuits for measuring these parameters will be described in logical sequence in order to facilitate an understanding of the invention.

*General Description*

The bridge is provided with phase angle dials, each displaying simple linear scales for the complete range of —90° to +90° phase angle. The distinction between positive and negative phase angles is made by means of a two-position switch. A coarse adjustment of phase angle measurement is made by a ten-position selector switch which chooses any one of the angles 0, 10°, 20°, . . . 80°. A fine adjustment of such measurement is made by a vernier rheostat which covers the continuous range from zero to 10°. The operator, after balancing the bridge, adds the readings of these two dials and observes the setting of the "sign" switch to learn the phase angle of the unknown impedance. The accuracy of the bridge depends primarily on fixed resistances and one linear rheostat. In addition to these element two variable capacitors are used, which need not be calibrated. It is required only that they have low dissipation factor and stability sufficient to maintain adjustment during measurement. There must also be provided a generator and detector as with a conventional bridge.

The complete device actually comprises three bridge circuits. One is used in the initial balance to adjust the variable capacitors. Another is used for the phase angle balance. A third interconnected bridge circuit is provided for the determination of impedance magnitude. A three-position function switch is used to set up either the initial balance circuit, the phase angle balance circuit, or the impedance balance. These positions will be referred to as I, $\phi$ and Z, respectively.

Elementary Phase Angle Circuit

Figure 1:
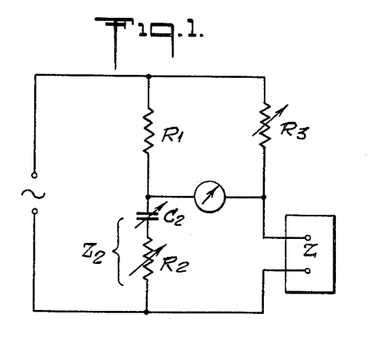
FIGURE 1 is a schematic diagram of the phase angle bridge in its simplest form.

A simple phase angle measuring bridge circuit is shown in FIGURE 1, comprising bridge arms $R_1$, $R_3$, $Z_2$ and an unknown impedance Z. The arm $Z_2$ comprises a series combination of resistance $R_2$ and capacitance $C_2$. The arms $R_1$ and $R_3$ are pure resistances. When the bridge is balanced, the phase angle of Z is the same as that of $Z_2$. This is $$\phi = \phi_2 = \tan^{-1}(X_2/R_2) \tag{1}$$

where $X_2$ is the reactance of the capacitor $C_2$. If $X_2$ is held at some fixed value $X_0$, the unknown angle $\theta$ is a unique function of $R_2$. The dial controlling $R_2$ can then be graduated to read $\theta$ directly for a fixed value of $X_2$. However, $X_2$ will vary when the frequency is changed. It is, therefore, necessary to adjust $C_2$ so as to keep $X_2$ equal to $X_0$. This is done first as an auxiliary operation called the "initial balance," the circuit for which will be described later. Following the initial balance, the phase angle is determined by adjusting $R_2$ and $R_3$ to balance. It is unnecessary to have a calibrated control for $R_3$, since the unknown phase angle depends only on $R_2$ and $C_2$.

Phase Angle Vernier Circuit

To read angles with high precision, it is convenient to have two controls, one coarse and one fine. The rheostat $R_2$ could, of course, be replaced by a combination of one coarse and one fine variable resistance connected in series. However, although the resistances of the two controls would be additive, the corresponding phase angles would not. Because of the non-linear relation between $\theta$ and $R_2$ expressed in Eq. 1, it would be impossible to graduate two dials in this situation so that the sum of the dial readings would always equal the phase angle $\theta$.

Figure 2:
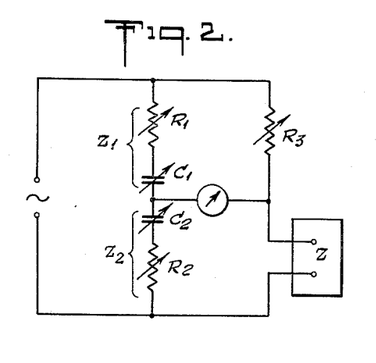
FIGURE 2 is a refinement of the bridge shown in FIGURE 1 and includes means for providing both coarse and vernier control for the determination of an unknown phase angle.

This limitation, however, is removed by the circuit shown in FIGURE 2. Here the capacitance $C_1$ has been added in series with $R_1$ to comprise another variable impedance $Z_1$. When the bridge is balanced, the complex impedances satisfy the equation $$Z = R_3 Z_2 Z_1 \tag{2}$$

The corresponding equations for impedance magnitude and phase angle are $$|Z| = R_3 |Z_2/Z_1| \tag{3}$$

and $$\theta = \theta_2 - \theta_1 \tag{4}$$

The last equation implies that, if the controls $R_1$ and $R_2$ are calibrated to read the phase angles of each of the arm $Z_1$ and $Z_2$ separately, then their difference gives the unknown phase angle. As will be explained below, a somewhat different method of calibration can be used so that the readings are actually additive. Thus, one of the arms can be used as a coarse control and the other as a vernier. An auxiliary initial balance circuit is used to set $C_1$ and $C_2$ to the proper values. In the above circuit $R_1$ and $R_2$ are then adjusted to provide the correct phase angle, Eq. 4, and $R_3$ is set for an impedance balance, Eq. 3.

Phase Angle Sign Control

With the above RC circuit the phase angles of the individual bridge arms $Z_1$ and $Z_2$ will always be negative. Further, the vernier is designed to cover only a small range, say 10°. In order to cover the required range of —90° to +90° and to provide easily read controls, a reversing switch S is added (FIG. 3) which interchanges the elements $Z_1$ and $Z_2$ in the corresponding arm. As can be seen from Eq. 4, this has the effect of reversing the sign of $\theta$. The control for the switch is marked so as to indicate the sign of the unknown angle. When measuring an impedance this indication is "+" for the right-hand position of FIGURE 3 and "—" for the left-hand position. In a bridge intended for the measurement of admittance according to the usual convention, these markings would be reversed. For either an impedance bridge or an admittance bridge the right-hand position could be marked "L" (inductive) and the left-hand position "C" (capacitive).

Initial Balance

Figure 3:
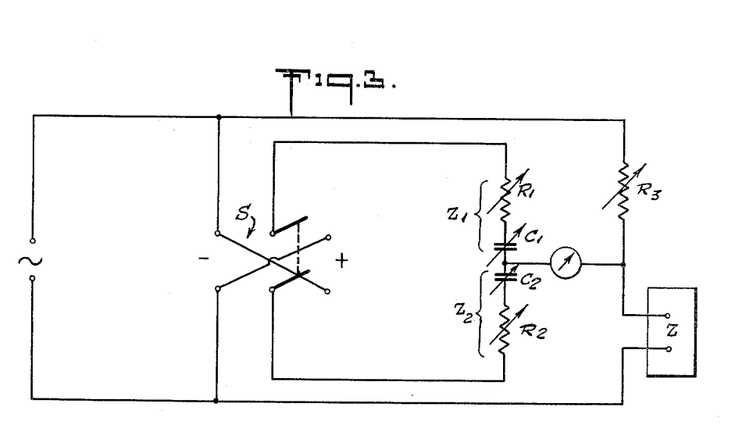
FIGURE 3 is a schematic diagram of the bridge shown in FIGURE 2, including a reversing switch for changing the sign of the phase angle.
Figure 4:
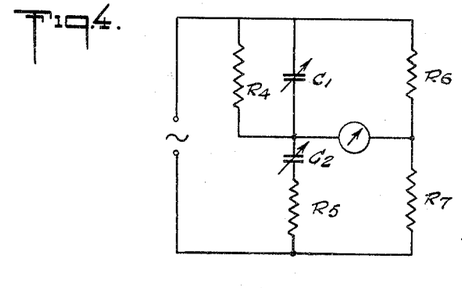
FIGURE 4 is a schematic diagram of a bridge circuit which is used in the initial adjustment of the phase angle bridge of FIGURES 1 or 2.

The circuit of FIGURE 4 is used to set $C_1$ and $C_2$ to their proper values. The resistances $R_4$ and $R_5$ have the value $R_0 = |X_0|$ where $X_0$ is the value of the desired reactance of the condensers $C_1$ and $C_2$. The resistance $R_6$ is $R_7/2$. In a refinement of this circuit, explained in a subsequent section, the resistance $R_4$ may be made slightly different from the nominal value $R_0$. When the capitances $C_1$ and $C_2$ are adjusted to balance this bridge, they will have the desired reactance at the frequency used. A special selector switch selectively connects the capacitors from the bridge of FIGURE 4 (initial balance) to the bridge of FIGURE 3 (phase angle balance). Once the initial balance has been made, different unknown impedances may be tested without repeating the initial balance, providing the frequency is not changed.

The Coarse Phase Angle Control

In FIGURE 3 the arm $Z_1$ comprising $R_1$ and $C_1$ is used to give a stepwise or coarse adjustment of phase angle in convenient increments, such as 10°. Although the figure shows a series combination of resistance and capacitance, a series connection for some angles and a parallel connection for others may be used. A three-gang selector switch (FIG. 5) chooses the correct fixed resistor and provides the appropriate connection, series or parallel, for each phase angle setting. In order to reduce the number of precision-fixed resistors, advantage is taken of the fact that the same resistor can be used to produce a certain phase angle and its complement by connecting it either in series or in parallel with the capacitor. Any one of the resistors may be used alone to give zero phase angle. For 10° steps, this reduces the number of resistors in this arm to four.

Figure 5:
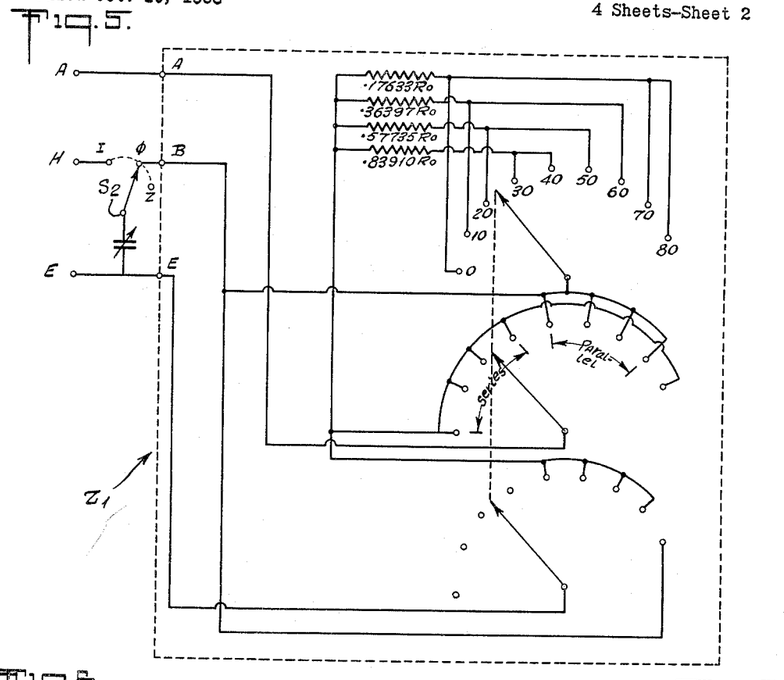
FIGURE 5 is a schematic diagram of one of the arms in the phase angle bridge of FIGURE 2.
Figure 10:
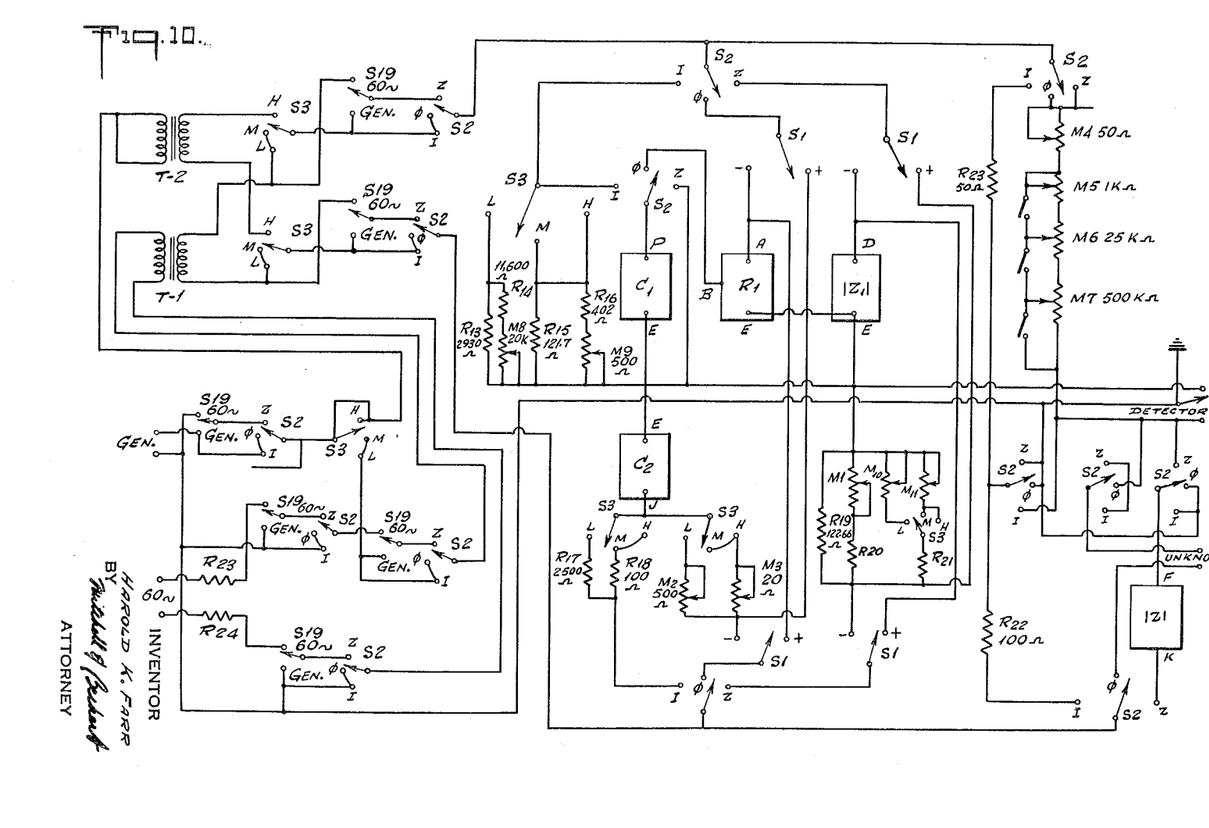
FIGURES 10 and 11 are a complete schematic diagram of a complete embodiment of a vector bridge capable of measuring the polar coordinates of a complex impedance.

Referring now to FIGURE 5, $S_2$ is one pole of the three-position selector switch used to set up either the initial, phase angle or impedance circuit, I, $\phi$ or Z (shown more fully in FIGURE 10). The three-position switch $S_2$ is shown in the phase angle connection; i.e., $S_2$ is in the $\phi$ position and the terminals A and E comprise the terminals of the impedance arm $Z_1$. The numbers 0, 10, 20 . . . 80 are the phase angle readings in degrees inscribed on the dial for this control which, however, are not the actual phase angle of the impedance $Z_1$. The dial reading is $$\theta_A = \theta_1 + 80° \tag{5}$$

where $\theta_1$ is the actual phase angle.

The use of fixed resistors permits highly precise values of resistance and very small errors due to stray inductance or capacitance.

The Vernier Phase Angle Control

The two series connected components $R_2$ and $C_2$ in FIGURE 3 comprise the vernier arm. The rheostat $R_2$ may be varied continuously over a range from zero to some maximum value, such that the phase angle of this arm varies from a low of —90° to a high somewhat above —80°. This provides the 10° range needed to cover the intervals between steps of the coarse control, plus one or two degrees more for overlap.

The actual phase angle of this arm is $$\theta_2 = \tan^{-1}(R_2/R_0) - 90° \qquad (6)$$

For values of resistance in the range used, $R_2$ is much smaller than $R_0$, and $\theta_2 + 90°$ is, therefore, almost exactly proportional to $R_2$. This means that, with a linear rheostat, the reading of the vernier dial will be close to a linear function of the dial rotation. In fact the slope of the curve of $\theta_2$ against $R_2$ changes by only 3% over the 10° range. This is a desirable convenience.

The restriction of the range of variation of the rheostat to the small interval corresponding to only 10° also improves the accuracy of the total reading. It is more difficult to provide precise resistance values and freedom from stray inductance in a variable resistance than in a fixed resistance. The effect of resistance errors is most serious at angle near −45° while inductance errors are largest at angles near zero. Since the vernier operates only near −90°, these errors are greatly reduced.

The dial of the vernier control is graduated with the readings $$\theta_B = -\theta_2 - 80° \qquad (7)$$

Hence, the sum of the readings of the coarse and the vernier controls is $$\theta_A + \theta_B = \theta_1 - \theta_2 \qquad (8)$$

With the sign switch in the right-hand position (FIG. 3), this is equal to the unknown phase angle. In the left-hand position, this value is prefixed with a negative sign.

Hence, once the bridge is balanced, the unknown phase angle is given by the sum of the two dial readings prefixed by the indication of the sign switch.

The purpose of the 80° shift in the dial readings Eqs. 5 and 7 is to restrict the vernier control readings mainly to the interval 0 to 10°. Actually, the readings are extended a little below zero to make the operation more convenient when a number of readings are taken which fall close together, but just above and below some multiple of 10°. For the portion of the dial below zero, it may be more useful to show the readings as $$\theta_B' = \theta_B + 10 = -\theta_2 - 70$$

This avoids negative values which would have to be subtracted from $\theta_A$. Instead, the vernier dial is used directly, but 10° are dropped from the reading of the coarse control. The inscription on this part of the dial can be made in a distinctive color to avoid confusion with the main portion of the dial. Also, an auxiliary index mark in the same distinctive color could be added to the coarse dail to read one step lower. Then the combination of the two dials could be direct reading in either color.

Other Methods of Phase Angle Graduation

The above description is based on a stepping interval of 10° for the coarse control. The same principle could be used for other intervals. Thus, any integral divisor of 90° could be used, such as 1° or 5°. If $s$ is this interval, then Eqs. 5 and 7 become $$\theta_A = \theta_1 + 90 - s \qquad (9)$$
$$\theta_B = -\theta_2 - 90 + s \qquad (10)$$

Equation 8 is still satisfied. The coarse control sets the phase angle of $Z_1$ to the values $$\theta_1 = 0, -s, -2s, -3s \ldots -90° + s$$

The rheostat varies the phase angle of $Z_2$ over the continuous range of −90° to −90°+$s$.

The calibration could also be made in radians instead of degrees. Here a slight modification is required because 90° is $\pi/2$ radians, which is not an intergral multiple of any useful interval, such as 0.10 radians.

For most angles, however, Eqs. 9 and 10 are simply translated into radians as $$\theta_A = \theta_1 + \pi/2 - s \qquad (11)$$
$$\theta_B = -\theta_2 - \pi/2 + s \qquad (12)$$

The control for $\theta_1$ selects values of resistances which result in values of $\theta_1$ that in turn give values of $\theta_A$ which are even multiples of $s$. For $s = 0.10$ radians, this is feasible for values of $\theta_A$ from 0 to 1.40 radians. With the vernier at full scale, this makes a total reading of 1.5000. In order to cover the remaining range from 1.5000 to 1.5708 radians (that is, up to 90°), one more setting of the coarse control is provided marked "1.500," which makes $Z_1$ a pure resistance (not in accord with Eq. 11). A special scale is also marked on the vernier control according to the equation $$\theta_B'' = \theta_2 - 1.50 \qquad (13)$$

This auxiliary scale is used only for angles greater than 1.50 and, therefore, covers a range of only 0.0000 to 0.0708.

Phase Angle Vernier Compensation

It is desirable, of course, to use a vernier dial with a printed face which is identical for all units. However, commercially available rheostats are not identical. Departure of rheostat values from nominal could lead to appreciable error. Fortunately, it is feasible to manufacture rheostats whose resistance function (resistance vs. rotation angle) can be represented by a straight line within acceptable accuracy. However, the slope of this line may depart appreciably from the desired value. A refinement of this invention makes provision for errors of this kind. This is done by adjusting the condenser $C_2$ so that the reactance $X_2$ differs from nominal by the same percentage as the slope of the rheostat resistance $R_2$. If $X_2$ and $R_2$ are scaled together, there will be no error in angle. The desired value of $X_2$ can be obtained by using appropriate values of resistance in the initial balance circuit of FIGURE 4. If the required correction is small, it can be accomplished by adjusting $R_4$ only. This will cause only a very slight error in the setting of the capacitor $C_1$. Thus, if $R_4$ alone is used to make a correction of 2% in $C_2$, the error in $C_1$ will be only 0.02%. This adjustment of $R_4$ would be made during manufacture and would not require attention during operation of the device unless it were necessary to compensate for wear in the rheostat $R_2$.

Frequency Range

As described previously, changes in frequency are accommodated by the initial balance in which the capacitors $C_1$ and $C_2$ are adjusted to have the correct constant reactance $X_0$. At very high frequencies, the capacitances of the capacitors $C_1$ and $C_2$ may then become so small that stray capacitances of the wiring and other circuit components cause large errors. On the other hand, at very low frequencies the required capacitors may be inconveniently large. For this reason it is desirable to use a relatively high value for the magnitude of $X_0$ at low frequencies and a much lower value at high frequencies. A value of 2500 ohms for the low range and 100 ohms for the high range has been found satisfactory. By providing 1.111 microfarads each for $C_1$ and $C_2$, operation is possible down to 60 c.p.s. in the low range. In the high range useful accuracies may be achieved up to at least a few hundred kilocycles.

Thus, the complete complement of resistors in the basic circuit for one frequency range comprises four fixed units for the initial balance circuit plus four fixed and one variable resistor for the phase angle balance. If use is made of the technique described above for correcting errors in the vernier rheostat $R_2$, then one of the fixed resistors in the initial balance circuit is replaced by an adjustable resistance.

Impedance Measurement

The impedance circuit is based on Eq. 3, which expresses the desired value $|Z|$ of the unknown impedance magnitude in terms of the impedance magnitudes of the other three arms of the phase angle bridge. This equation can be evaluated by means of the bridge shown in FIGURE 6. All four arms comprise resistances equal in magnitude, but not phase, to the four impedances in Eq. 3. Each arm corresponds to a related arm of the phase angle bridge circuit shown in FIGURE 2.

Figure 6:
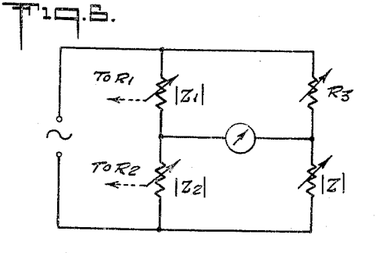
FIGURE 6 is a simplified schematic embodiment of an impedance measuring bridge.

In FIGURE 6, $R_3$ is the same physical component as used in the phase angle bridge. Following the phase angle determination, this arm is switched into the impedance bridge of FIGURE 6 without changing its setting. Arms $|Z_1|$ and $|Z_2|$ are variable resistances which are ganged to $R_1$ and $R_2$ of FIGURE 2 and have resistance values $$|Z_1| = \sqrt{R_1^2 + X_1^2} \qquad (14)$$

and $$|Z_2| = \sqrt{R_2^2 + X_2^2} \qquad (15)$$

where $X_1$ and $X_2$ are the reactances of $C_1$ and $C_2$. Since $X_1$ and $X_2$ have both been set to the fixed value $X_0$, there will be a definite fixed relation between $|Z_1|$ and $R_1$ and between $|Z_2|$ and $R_2$ which permits ganging. Thus, when the operator adjusts $R_1$ and $R_2$ to make the phase angle balance, the resistances $|Z_1|$ and $|Z_2|$ of FIGURE 6 are automatically set at their correct values.

The arm $|Z|$ in FIGURE 6 is a calibrated rheostat or resistance decade unit which is adjusted to balance the bridge. The desired value of $|Z|$ is then read from the controls of this arm. It will be noted that, since this is a pure resistance bridge, an adjustment of only one parameter is required to make a balance.

Figure 7:
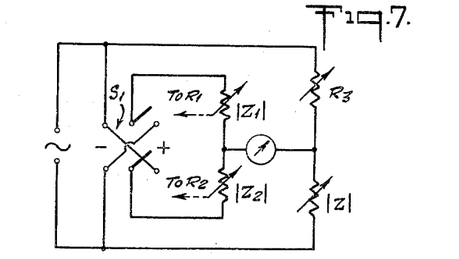
FIGURE 7 is a refinement of the bridge shown in FIGURE 6 including a reversing switch for interchanging the impedance element in two arms of the bridge.

The principle of the impedance measurement in its simplest form has been outlined in connection with FIGURES 2 and 6. Actually, of course, the phase angle circuit based on FIGURE 3 has greater utility than that of FIGURE 2. The corresponding impedance magnitude measuring bridge is shown in FIGURE 7. The variable resistances $|Z_1|$ and $R_1$ are ganged together, as are $|Z_2|$ and $R_2$. The double-pole, double-throw switch $S_1$ is also ganged to the corresponding switch shown in FIGURE 3.

The Coarse Arm of the Impedance Bridge

The $Z_1$ arm ($R_1$ and $C_1$) of FIGURE 3 is controlled by the nine-position selector switch shown in FIGURE 5. One more section is added to this control which selects any one of nine fixed resistors for the arm $|Z_1|$ of FIGURE 7. The resistance values are computed in accordance with the equation $$|Z_1| = R_0 / \sin|\theta_1| \qquad (16)$$

$$|Z_1| = R_0 \sin|\theta_1| \qquad (17)$$

for the series or parallel connections. In addition to the four series and four parallel positions of the coarse phase angle control for $C_1$ and $R_1$, one more position, corresponding to $\theta_1 = 0$, is provided. This position is for a pure resistance. This same resistance, or an identical one, is connected into the $|Z_1|$ arm of FIGURE 7 for this position.

The Vernier Arm of the Impedance Bridge

Figure 8:
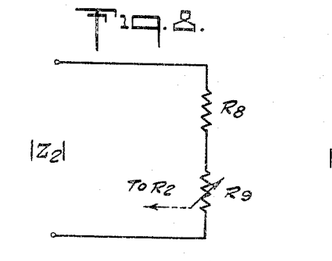
FIGURES 8 and 9 are alternative arrangements for one of the arms in the bridge of FIGURE 7.

The arm $|Z_2|$ of FIGURE 7 is a combination of fixed resistors, and a rheostat which is ganged to the rheostat $R_2$ of FIGURE 3 so as to develop a resistance $$|Z_2| = \sqrt{R_0^2 + R_2^2} \qquad (18)$$

where $R_0$ is equal to the magnitude of the fixed reactance $X_0$ of capacitances $C_1$ or $C_2$. The relation between $|Z_2|$ and $R_2$ is seen to be non-linear. However, since $R_2$ is a vernier control, it will always be much smaller than $R_0$. This means that the total percentage variation in $|Z_2|$ is quite small. In one embodiment, $R_2$ covered a range from zero to $R_0/5$ to produce a variation in $\theta_2$ of about 11.5°. This resulted in a variation in $|Z_2|$ of about 2% overall, from $R_0$ to 1.02 $R_0$. This could be obtained as in FIGURE 8 by means of a fixed resistor $R_8$, in series with a rheostat $R_9$ covering the range from zero to 0.02 $R_0$. This rheostat is mounted on the same shaft with $R_2$ but has a specially tapered winding to provide the correct resistance function. When $R_2$ is a linear rheostat, this function is $$|Z_2| - R_0 = \sqrt{R_0^2 + \left(\frac{\phi}{\phi_0} R_{20}\right)^2} - R_0 \qquad (19)$$

where $\phi$ = the rotation angle
$\phi_0$ = total range of $\phi$
$R_{20}$ = maximum value of $R_2$ Because the resistance of this rheostat is only a small fraction of the total resistance $|Z_2|$ it does not need to be wound with high precision. In one practical embodiment it contributed not more than 2% of the total resistance and an error of 5% in the rheostat value resulted in an error of only 0.1% in $|Z_2|$.

Figure 9:
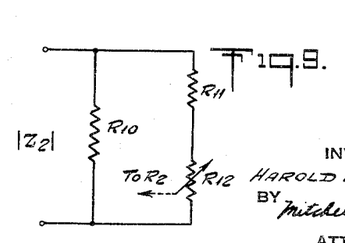

This circuit for $|Z_2|$, however, has the disadvantage that the resistance of the rheostat may become inconveniently small, e.g., with $R_0 = 100$, it would be 0 to 2 ohms. It may be difficult to wind a prescribed taper in very low resistance. A circuit which uses a high resistance rheostat is shown in FIGURE 9. Here $R_{10}$ is made slightly greater than $R_0$ while $R_{11}$ and $R_{12}$ are much greater. Then a wide variation in $R_{12}$ produces the desired small change in $|Z_2|$. The calculation of the relation between resistance and rotation angle for the rheostat $R_{12}$ is somewhat more complicated than with the series circuit but is, nevertheless, straightforward. One of the resistances in this circuit can be chosen arbitrarily within certain limits. In one embodiment the resistance $R_{11}$ was chosen to be about equal to the maximum value of $R_{12}$. This resulted in a value of $R_{11}$ and $R_{12}$ max. about equal to 25 $R_0$ and of $R_{10}$ about 1.04 $R_0$ to give the desired range of $R_0$ to 1.02 $R_0$ for $|Z_2|$. To compute the taper for $R_{12}$, one expresses $|Z_2|$ in terms of $R_{10}$, $R_{11}$, and $R_{12}$ as shown in FIGURE 9. This equation is solved for $R_{12}$, in terms of $|Z_2|$, and $|Z_2|$ is expressed in terms of the rotation angle $\phi$ by means of Eq. 19 plus $R_0$. In this circuit also, one is permitted a fairly wide tolerance on the percentage conformance of $R_{12}$ to the computed resistance function. In fact the relations in terms of percent error are about the same as for the series circuit.

Impedance Scale

In the above description the resistances $|Z_1|$ and $|Z_2|$ in the impedance bridge have been equated to the corresponding magnitudes in the phase angle bridge. Actually, it is required only that the ratios $|Z_1/Z_2|$ have the same value in each of the two circuits. $R_3$ and $|Z|$, of course, cannot be scaled up or down. This means that the value of $R_0$ appearing in the equations for the impedance bridge need not be the same as that used in the phase angle bridge. This in turn makes it unnecessary to change any of the resistance values in the impedance bridge when the frequency range is changed. Changing the position of the frequency range switch changes the resistors and rheostats used in the initial balance and phase angle bridge circuits but not those of the impedance bridge.

Low Frequency Operation of the Impedance Bridge

The voltage applied to the impedance bridge circuit may be either A.C. or D.C. The information necessary for the determination of the impedance magnitude is actually obtained during the phase angle measurement. The function of the impedance bridge is to reduce the information to a useful form. Except for errors due to stray reactances in the bridge circuits, the impedance reading is, therefore, independent of the frequency used for the impedance bridge. The impedance is determined solely by the frequency used during the initial balance and the phase angle movement.

Most conveniently the bridge can be powered from the same voltage source as used for the initial and phase angle bridges. However, there is some advantage in using D.C. or low frequency. At high frequency errors are introduced by residual capacitances and inductances in the components of the bridge. In fact this possibility may be regarded as one advantage of the invention. It will be recalled that the elimination of phase angle errors is usually more difficult in a rheostat than a fixed resistor. The initial balance requires no rheostats. The phase angle balance requires rheostats in two arms $Z_2$ and $R_3$. The $Z_2$ arm is a vernier and this keeps the phase angle error small. The $R_3$ arm requires no calibration and this permits use of construction techniques which achieve good phase angle characteristics. Finally, the impedance balance requires accurately calibrated resistance controls but may be operated at D.C. or low frequency where phase angle is not a problem.

The function switch that sets up each of the three bridge circuits may also be used to connect a source of direct current and a galvanometer detector for the impedance bridge if D.C. operation is desired, or it may connect a source of low frequency which will permit use of the same detector for all functions.

The Complete Vector Bridge

A practical circuit embodying the foregoing principles is illustrated in FIGURE 10.

Control S-2 is a three-position, multiple selector "Function" switch, which sets up any of the three circuits: Initial, phase angle or impedance balance, indicated in FIGURE 10 as I, $\phi$ or Z.

At the left side of FIGURE 10 are shown two pairs of terminals marked "Gen" and "60$\sim$" to which are connected appropriate voltage sources. Normally, the bridge is operated from the first pair of terminals to which is connected a generator operating at any desired frequency, which in one practical embodiment might lie anywhere in the range of approximately 20 to 500,000 cycles per second. However, the operator may select for the "Impedance" balance either of the two voltage sources. This selection is made with control S-19 which is a two-position selector switch called the "Z Source" switch. It is intended that the "60$\sim$" terminals be connected to a source of 115 volt, 60 cycle power. The bridge is powered from the 60 cycle source only when the Function Switch is set at "Z" and the Z source switch is set at "60$\sim$." For all other settings the bridge is powered by the Generator. Resistors $R_{23}$ and $R_{24}$ limit the 60 cycle current to safe values. To eliminate the possibility of electrostatic coupling between the high voltage portions of the 60 cycle circuit and the bridge proper, additional contacts of switches S-2 and S-19 are used to interpose grounded leads in the 60 cycle circuit when the bridge is powered by the generator.

Transformers T-1 and T-2 are used to isolate the voltage source from the remainder of the bridge. This permits simultaneous grounding of generator, detector and unknown impedance. Transformer T-1 is used at low frequencies and T-2 at high frequencies. In one practical embodiment, these ranges were approximately 20 to 10,000 cycles and 10,000 to 500,000, respectively.

In this circuit there is also provision for operating with capacitors $C_1$ and $C_2$ having nominal reactance values of either 2500 or 100 ohms, as explained previously. The necessary change in resistance values and the selection of the appropriate isolation transformer is accomplished by means of control S-3, a three-position frequency range switch. The designations L, M and H refer to three frequency ranges, low, medium and high. When this switch is moved from low to medium, the values of resistance are changed from those required for a 2500 ohm reactance to those for a 100 ohm reactance. In switching from medium to high, transformer T-2 replaces T-1. When the Z Source switch is on 60$\sim$ and the function switch is on "Z," transformer T-1 is selected regardless of the setting of the range switch.

With the function switch set at "I," the circuit of FIGURE 10 corresponds to that of FIGURE 4. The resistors $R_{17}$ and $R_{18}$ in FIGURE 10 are alternative values of $R_5$ in FIGURE 4 used for the low or the medium and high ranges, respectively. In the low-range the network consisting of $R_{13}$, $R_{14}$ and $M_8$ constitutes the resistance $R_4$ of FIGURE 4. By adjusting $M_8$ the resistance of $R_4$ is made to assume the value required to compensate for errors in the phase angle vernier rheostat, as explained previously. The network consisting of $R_{15}$, $R_{16}$ and $M_9$ has the same function in the medium and high ranges. Resistances $R_{22}$ and $R_{23}$ correspond to $R_7$ and $R_6$, respectively.

Figure 11:
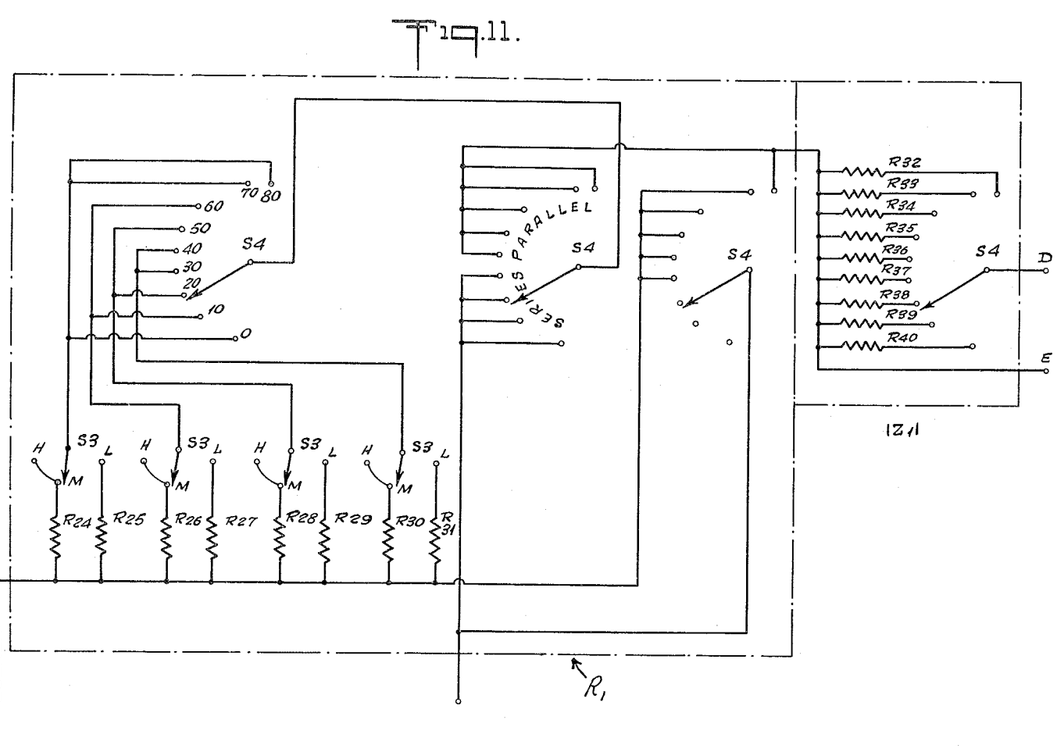

With the Function switch in the "$\phi$" position, FIGURE 10 corresponds to FIGURE 3. The control $S_1$ is a two-position switch corresponding to the reversing switch of FIGURE 3, used to control the sign of the phase angle to be measured. The phase angle vernier rheostat is shown as $M_2$ or $M_3$ for separate frequency ranges. The component $R_1$ is shown in detail in FIGURE 11. This corresponds to FIGURE 5 with the addition of a second set of resistors to cover another frequency range. The bridge arm comprising rheostats $M_4$, 5, 6 and 7 corresponds to $R_3$ of FIGURE 3. The several controls allow convenient coverage of a wide range of impedances. Shorting switches eliminate terminal resistance of rheostats not in use. The device to be tested is connected to the terminals marked "Unknown" in FIGURE 10 and corresponds to arm "Z" of FIGURE 3.

With the function switch in the "Z" position, FIGURE 10 corresponds to FIGURE 7. Arms $|Z|$ and $|Z_1|$ are similarly designated in both figures. Arm $|Z_1|$ is also shown in detail in FIGURE 11. In the low frequency range the network consisting of resistances $R_{19}$, $R_{20}$, $R_{21}$, $M_1$, $M_{11}$ and $M_{10}$ is a refinement of that shown in FIGURE 9, which in turn represents the arm $|Z_2|$ of FIGURE 7. Resistances $R_{20}$ and $R_{11}$ are corresponding components. $M_1$ or $R_{12}$ is the rheostat ganged to the phase angle vernier rheostat. Thus, $M_1$, $M_2$ and $M_3$ are all on a common shaft. The combination of $R_{19}$, $R_{21}$ and $M_{10}$ corresponds to $R_{10}$. The adjustable resistance $M_{10}$ permits compensation in the $|Z_2|$ arm for errors in rheostat $M_2$. On the medium and high frequency ranges, $M_{11}$ performs a similar function with respect to $M_3$.

Combination Phase Angle Bridge and Impedance or Admittance Meter

It will be clear that the circuit described above for the measurement of phase angle can be used alone, in combination with the previously described impedance circuit or with other circuits for impedance or admittance measurement. In particular it can be combined with so-called "impedance or admittance meters." An impedance meter comprises a constant current source supplying power to the unknown impedance and a high impedance voltmeter connected in parallel with the unknown. With proper adjustment of the current source, the voltmeter provides a direct reading of impedance magnitude. An admittance meter consists of a constant voltage source and ammeter or milliammeter connected in series with the unknown admittance and voltage source.

Suitable switches would be provided for selecting the initial balance circuit, the phase angle bridge or the impedance or admittance meter.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:
1. An alternating current bridge circuit for measuring the phase angle of an unknown impedance comprising four arms, a first arm consisting essentially of a first variable resistor and a first variable capacitor, a second arm consisting essentially of a second variable resistor, said first and second arms being connected to one diagonal point of the bridge, a third arm consisting essentially of a third variable resistor and a second variable capacitor, the unknown impedance being adapted to be connected in the fourth arm, the third and fourth arms being connected to the opposite diagonal point, said first and second capacitors having a predetermined reactance at a given frequency, means for applying alternating current at a frequency equal to said given frequency to said diagonal points, and a detector coupled across the opposite pair of diagonal points, the phase angle of the unknown impedance being determined by varying the value of said resistors until said bridge is balanced.

2. The bridge circuit of claim 1, in which the magnitudes of said first and third resistors are so related that as they are varied one functions as a coarse control and the other functions as a vernier control, the resistor values being a direct indication of the phase angle of the unknown impedance.

3. The bridge circuit according to claim 1, and further comprising a second bridge circuit for measuring the magnitude of said unknown impedance, a variable resistor in a first arm thereof ganged to the variable resistor in the first arm of the phase angle measuring bridge, said second variable resistor constituting the second arm of said second bridge, a variable resistor in the third arm of said second bridge ganged to said third variable resistor in the phase angle measuring bridge, and a variable resistor connected in the fourth arm of said second bridge, said first and second arms being connected to one diagonal point and said third and fourth arms being connected to the opposite diagonal point, means for applying alternating current to said one and opposite diagonal points, and a detector coupled across the opposite pair of diagonal points, the ganged resistors in said second bridge having values related to the associated resistors in the phase angle measuring bridge so that when the phase angle measuring bridge is balanced the gang resistors in said second bridge have known values, the magnitude of the unknown impedance being determined by varying the resistance of said variable resistor in the fourth arm of said second bridge until said second bridge is balanced, whereby the resistance value of the bridge balancing resistor is a direct indication of the magnitude of the unknown impedance.

4. The circuit according to claim 1, and further comprising a reversing switch for selectively interchanging the elements in said first and third arms, whereby the sign of the phase angle may be selectively reversed.

5. The circuit according to claim 1, wherein said variable resistor in said first arm comprises a plurality of fixed resistors and a selector switch for selecting desired ones of said fixed resistors, and said variable resistor in said third arm comprises a rheostat, whereby the fixed resistors provide coarse control of phase angle measurement and said rheostat provides vernier control.

6. The circuit according to claim 1, and in combination therewith, an additional bridge circuit including arms, means for applying alternating current thereto, and detector means connected thereto for determining when said additional bridge is balanced, and means for selectively switching said variable capacitors of said phase angle measuring bridge into different arms of said additional bridge and adjusting said capacitors when thus connected, whereby the capacitors are initially connected in said additional bridge for reactance adjustment and then switched to the phase angle bridge for phase angle determination.

7. The circuit according to claim 6, in which the same detector is employed for both of said bridge circuits, and means for selectively connecting said detector into the desired bridge circuit.

8. The circuit according to claim 6, wherein said means for applying alternating current comprises a common generator selectively connected to each of said bridge circuits.

9. A phase angle measuring device comprising a first bridge circuit having four arms, a first arm consisting essentially of a fixed resistor, a second arm consisting essentially of a first variable resistor, a third arm consisting essentially of a variable capacitor having a predetermined reactance at a given frequency and a second variable resistor, an unknown impedance being adapted to be connected in the fourth arm of said bridge, means for applying alternating current at said given frequency to the diagonal points joining said first and second arms and said third and fourth arms respectively, detector means coupled across the opposite pair of diagonal points, whereby the unknown phase angle may be determined by varying said variable resistors until said first bridge is balanced, a second bridge circuit for setting said capacitor at said predetermined reactance, said second bridge circuit comprising arms, means for applying alternating current thereto and detector means connected thereto for determining when said second bridge is balanced, and means for selectively switching said capacitor from said second bridge to said first bridge.

10. A device for measuring the polar coordinates of a complex impedance, comprising a first bridge circuit for measuring the phase angle of said impedance, said bridge circuit comprising a variable resistor and a variable capacitor in each of the first and third arms of said bridge, a variable resistor in the second arm of said bridge and the complex impedance in the fourth arm of said bridge, means for applying alternating current at a given frequency to the diagonal points joining said first and second arms and said third and fourth arms respectively, detector means coupled across the opposite pair of diagonal points, a second bridge circuit for adjusting the reactances of said variable capacitors so that said capacitors exhibit a predetermined reactance at said given alternating current frequency, said second bridge circuit comprising bridge arms, means for applying alternating current to said bridge, and detector means connected to said bridge for determining when said bridge is balanced, switching means for selectively switching said variable capacitors from said first bridge circuit to said second bridge circuit, whereby upon adjusting said variable capacitors to said predetermined reactances said capacitors are switched into said first bridge circuit, the phase angle of said complex impedance being determined by adjusting the variable resistors in said first and third arms; a third bridge circuit for measuring the magnitude of said complex impedance, said third bridge comprising bridge arms, means for applying alternating current to said bridge, and detector means connected to said bridge for determining when said bridge is balanced, said third bridge having variable resistors in the first and third arms thereof ganged to said variable resistors in the corresponding arms of said first bridge, said variable resistor in the second arm of said first bridge constituting the second arm of said third bridge, and a variable resistor in the fourth arm of said third bridge, the ganged resistors in said first and third arms of said third bridge being related in value to the associated resistors in said first bridge, whereby when said variable resistors in said first bridge are adjusted for determining the phase angle of the unknown impedance the ganged resistors in said third bridge are automatically adjusted to a known value, the magnitude of the complex impedance being determined by adjusting the variable resistor in the fourth arm of said third bridge, whereby when said bridge is balanced the value of said variable resistor is a direct indication of the magnitude of the complex impedance, and means for selectively switching the variable resistor in said second arm from said first bridge circuit to said third bridge circuit.

11. The device according to claim 10, wherein the variable resistor in the first arm of said first bridge circuit comprises a plurality of fixed resistors and means for selectively switching said resistors in series or parallel combination with the variable capacitor in said first arm, said resistors being selected to give phase angle measurements in relatively wide increments, whereby the components in said first arm provide a coarse reading of the phase angle.

12. The device according to claim 11, wherein said variable resistor in said third arm of said first bridge comprises a rheostat, the range of said rheostat covering the range of phase angles between adjacent phase angle increments produced by the resistors in said first arm, whereby said third arm provides a vernier control for the determination of phase angles.

13. The device according to claim 12, and further comprising switches in said first and third bridges having a common control for interchanging the components in said first and third arms respectively, whereby the sign of the unknown phase angle may be selectively reversed.

14. The device according to claim 13, wherein the values of said resistors in said first arm are selected so that when said resistors are connected in series with said variable capacitor a first range of phase angles is produced and when said resistors are connected in parallel with said variable capacitor a second range of phase angles is produced corresponding to the complements of the first range of phase angles.

15. The device according to claim 14, wherein said second bridge comprises means for adjusting the reactance of said variable capacitor in said third arm to compensate for any error in the rheostat connected in series therewith.

16. The circuit according to claim 10, wherein each of said first arms of said first and third bridges comprises a plurality of fixed resistors, and a selector switch common to both said arms, whereby said arms are ganged together.

17. The circuit according to claim 10, wherein the variable resistors in the third arms of said first and third bridges comprise respective rheostats in each of said arms mounted on a common shaft, whereby said arms are ganged together.

18. The circuit according to claim 17, wherein the third arm of said third bridge further comprises a resistor for compensating any error in the rheostat in the corresponding arms of said first bridge.

19. The circuit according to claim 17, wherein the resistance range of said rheostat in the third arm of said third bridge is capable of producing a relatively small change in the total resistance of said arm, whereby inherent errors in said rheostat contribute negligible errors in the impedance determination.

20. The device according to claim 15, wherein said means for adjusting the resistance of said variable capacitor comprises resistance means in said second bridge circuit.

21. The device according to claim 20, wherein said resistance means comprises a single resistor.

References Cited in the file of this patent

UNITED STATES PATENTS

| 1,847,127 | Mayer | Mar. 1, 1932 |
| 2,589,758 | Wojciechowski | Mar. 18, 1952 |

FOREIGN PATENTS

| 625,023 | Great Britain | June 21, 1949 |

OTHER REFERENCES

Tele-Tech: "Direct Reading Vector Impedance Bridge," June 1949; pages 40–42 and 64.

Burgess: "All About Impedance Bridges," CQ Radio Amateurs Journal, September 1954; pp. 43, 44, 45, 52, 56, and 58.